United States Patent [19]
Brown

[11] Patent Number: 5,146,619
[45] Date of Patent: Sep. 8, 1992

[54] EAR-SUPPORTED RADIO

[76] Inventor: Nancy Brown, #3 Solitude Way, Wilmington, Del. 19808

[21] Appl. No.: 557,022

[22] Filed: Jul. 25, 1990

[51] Int. Cl.$^5$ .............................................. H04B 1/08
[52] U.S. Cl. ..................................... 455/351; 455/344
[58] Field of Search ................. 455/90, 100, 344, 347, 455/351; 381/187; D14/136, 156, 163, 165, 192, 205, 223

[56] References Cited

U.S. PATENT DOCUMENTS

| | | |
|---|---|---|
| D. 174,053 | 7/1955 | Norris . |
| D. 272,904 | 3/1984 | Kawaro . |
| D. 284,859 | 7/1986 | Okada . |
| D. 293,107 | 12/1987 | Müller . |
| D. 299,129 | 12/1988 | Wiegel . |
| D. 321,881 | 11/1991 | Hopewell . |
| 4,539,708 | 9/1985 | Norris . |
| 4,682,363 | 7/1987 | Goldfarb et al. . |
| 4,856,086 | 8/1989 | McCullough . |
| 4,858,248 | 8/1989 | Goldsmith et al. ................. 455/351 |
| 4,972,468 | 11/1990 | Murase et al. ...................... 381/187 |

OTHER PUBLICATIONS

371009 Aqua Band FM Radio, p. 22.
Sports Mate TM Headband FM Stereo, Stereo Headphones & AM/FM Stereo with headphones, p. 98.
Roberta Fortunes' Almanac, Toshiba Digital Headset #TS474.
Fortunes' Active Health, Sony Sports FM Radio #S0722.
Page 278y, #1, 2, 3, 4, 8, 9, 10, 11, 12 and 13.

Primary Examiner—Curtis Kuntz
Attorney, Agent, or Firm—Pollock, Vande Sande & Priddy

[57] ABSTRACT

An ear radio adapted for support by the ears of a user comprises first and second ear components, each including a casement having inner and outer surfaces and adapted in size and configuration to fit over an ear of the user. Radio circuitry is provided for receiving radio signals and converting the radio signals to sound and is mounted within a first casement. Radio function controls are mounted on the exterior surface of the first casement. A speaker is mounted on the inner surface of the first casement and is operatively connected to the radio circuitry mounted on its inner surface. The speaker is adapted to extend within the ear canal of the ear. A first retention member is provided for retaining the first component at one ear, and is configured to conform to the juncture between the ear and the head of the user. A second radio component includes a similar second casement having inner and outer surfaces and adapted in size and configuration to fit over the user's second ear. A power supply means is mounted within the second casement, and a radio speaker is mounted on the inner surface of the second casement and adapted to extend within the ear canal of the second ear. A second retention member is provided for retaining the second component at the second ear and is configured to conform to the juncture between the second ear and the head of the user. Circuitry is provided for electrically connecting the power supply and the speaker in the second component with the radio circuitry in the first component.

11 Claims, 2 Drawing Sheets

EAR-SUPPORTED RADIO

FIELD OF THE INVENTION

The present invention is generally directed to a personal audio system and, in particular, to a personal ear-supported radio system to be worn when a person is involved in sports activities.

BACKGROUND ART

Receiving devices, such as portable radios, are known in the art. Some portable radios are specifically designed for single users and usually include a small housing containing the electronic circuit of the radio, and the headphones worn on the listeners head to support individual speakers for each ear. These headphones are connected to the radio circuitry by a flexible conductor wire. Such single-user radio which is typically characterized by a three-part system, i.e. a radio, a headset and a connector wire has various disadvantages. In particular, the wire will necessarily hang down from the headphones to the radio with the possibility of becoming entangled with some foreign device. This could cause damage to the radio or headphones, or even injure the listener. Furthermore, when the radio is not being used, the headphones and the wire can be difficult to store and can easily become knotted. The headphones can also become uncomfortable after being worn for an extended period of time. Additionally, the headphones and radio are usually physically unattractive, and can preclude the wearing of a headset. The headphones can also affect one's hairstyle, even after the headphones are removed.

Some improvement to a conventional, three-part system, has been provided in the art by substituting the three-part system with a two-part system including a radio and headset or headphones, which house the radio. However, such a structure in which the radio is supported in the headphone, is still uncomfortable, has an unattractive appearance when worn and when taken off, it leaves indentations in the hair. Three-part and two-part radio systems have other disadvantages. For example, the apparatus that houses the radio in the two-part system or speaker in the three-part system typically sweeps back and forth on the head and eventually loosens and falls from the user's ears, requiring constant readjustment, consequently hindering the listening pleasure of the radio users. The slippage is common to every headphone set, and is especially a problem to an active listener who participates in vigorous sports or activities, like jogging, skiing or bicycling.

Some further attempts have been made in the art to eliminate the above disadvantages of the prior art three-part and two-part single user radios. One example is U.S. Pat. No. 4,539,708 to Norris which suggests a self-contained radio device adopted in size and configuration for placement and retention at the entrance of the ear canal, such that the device is fully self-supported by surrounding ear cartilage. However, this kind of structure is inconvenient for those involved in sport activities, and additional support for the radio is typically necessary to ensure that the radio device does not fall off the ear during the sport or other vigorous activities.

It appears that there is a need in the art to provide an ear-supported radio device which could be conveniently supported by the user's ears and would safely and securely remain supported by the user's ears even during some vigorous activities of such user.

SUMMARY OF THE INVENTION

It is a primary object of the present invention to provide a portable, ear-supported, self-contained radio including two components, each of which is adapted in size and configuration to an ear of the user and when interconnected, results in a fully operational radio device.

It is a further object of the present invention to provide a fully operational radio device which requires no additional support beyond that provided by the ear and the opening of the ear canal.

It is another object of the present invention to provide two lightweight ear components of essentially equal weight comprising a fully operational radio.

It is still another object of the present invention to provide better comfort to the user while listening to such portable, single-user radio.

It is another object of the present invention to provide a more attractive appearance to an individual both during and after use of the radio device.

It is still another object of the present invention to provide a radio device which includes touch-activated circuitry for controlling volume, frequency selection and more power supply to the radio circuitry.

Still another object of the present invention is to provide a simple and inexpensive radio device which can be used by a listener during various activities and does not impend normal personal activities or exercising or does not require any adjustment during such activities.

Still another object of the present invention is to provide a convenient earphone which can easily be placed in the user's ear for use and, if necessary, adjusted for comfortable and secure support by the individual user's ears.

It is also an object of the present invention to provide a radio device having a compact, aesthetic and attractive appearance.

These and other objects are accomplished by a structure of an ear radio according to the present invention which is adapted for support by the ears of the user, and comprises two ear components. A first component includes a first casement having inner and outer surfaces and adapted in size and configuration to fit over a first ear of the user, radio circuitry means for receiving radio signals and converting the radio signals to sound, mounted within the first casement, radio function controls mounted on the exterior surface of the first casement, radio speaker means operatively connected to the radio circuitry means and mounted on the inner surface of the first casement and adapted to extend within the ear canal of the first ear and first retention means for retaining the first component at the first ear of the user. The first retaining means is configured to conform to the juncture between the first ear and the head of the user.

A second component of the radio device includes a second casement having inner and outer surfaces and adapted in size and configuration to fit over a second ear of the user, power supply means mounted within the second casement, radio speaker means mounted on the inner surface of the second casement and adapted to extend within the ear canal of the second ear, and second retention means for retaining the second component at the second ear of the user. The second retention means is configured to conform to the juncture between the second ear and the head of the user. Also, circuitry is provided for electrically connecting the power supply means and the speaker means in the second component with the radio circuitry means in the first component.

In the preferred embodiment, the first and second retaining means includes a flexible, but firm, wire-like element.

In the following description, reference is made to one preferred embodiment of the present invention in conjunction with the accompanying drawings, wherein:

Figure 3:
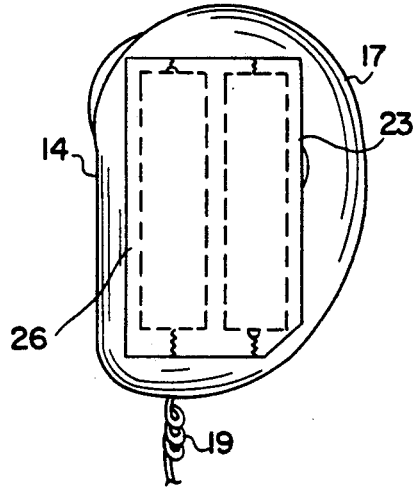
Figure 4:
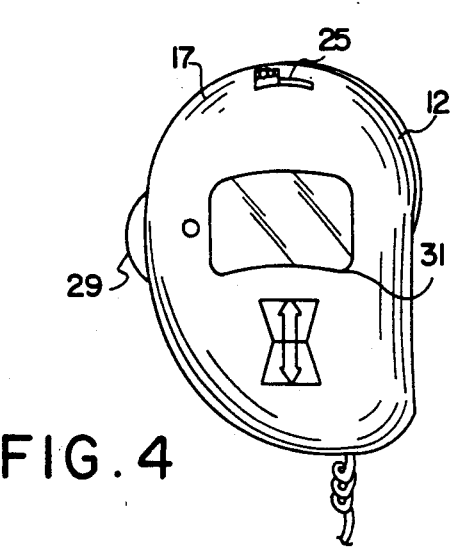
Figure 5:
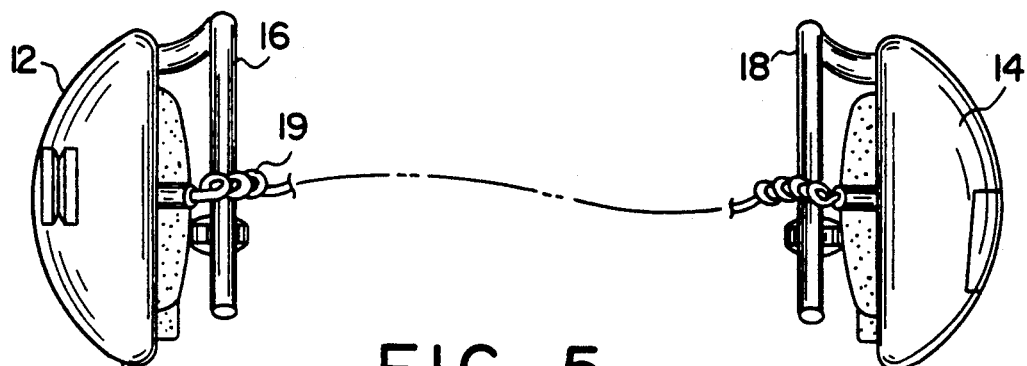

The inner side of the left ear component is the mirror image of the inner side of the right ear component;

FIG. 3 is an elevational view of the outer side of the left ear component of the ear-supported radio;

FIG. 4 is an elevational view of the outer side of the right ear component of the ear-supported radio;

FIG. 5 is a bottom view of the two-piece ear-supported radio; and

Figure 6:
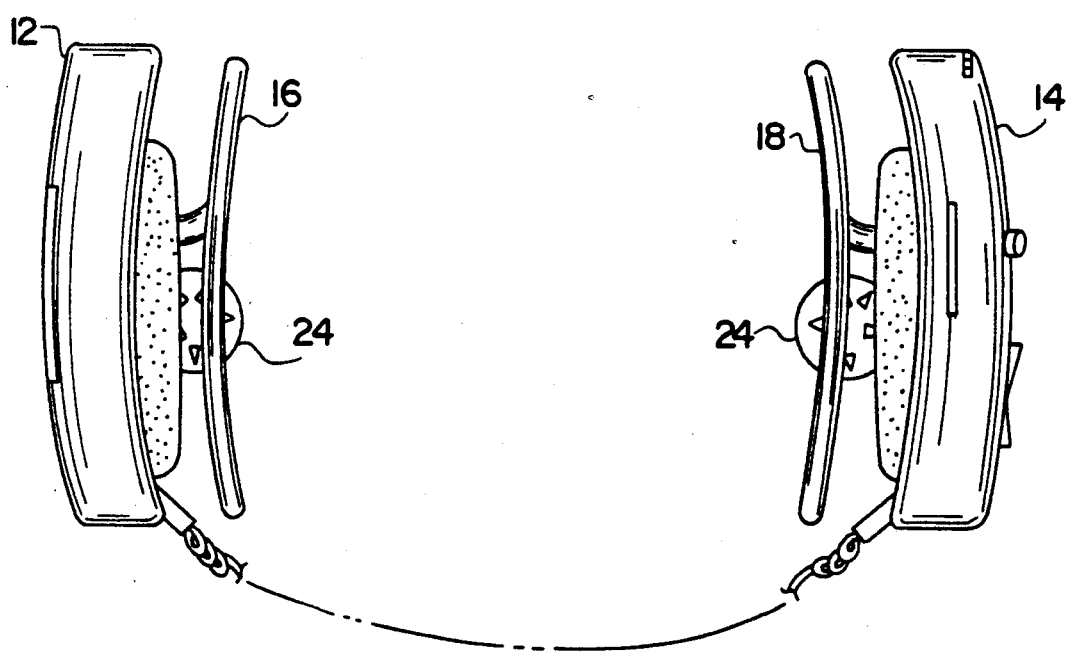

FIG. 6 is a side view of the two-piece ear-supported radio.

DETAILED DESCRIPTION OF THE PREFERRED EMBODIMENT(S)

Referring now to the drawings, FIGS. 1-6 show a two-piece ear-supported radio device 10, constructed in accordance with the present invention. The ear-supported radio device 10 is a self-contained, fully operational radio which is worn at the user's ears and requires no additional support means or power supply. The geometric configuration of the radio device 10 in the preferred embodiment shown includes two kidney-like shaped ear components 12, 14.

Each ear component 12, 14 is comprised of a casement 11, 13 having an inner surface 15 and an outer surface 17 when viewed in relation to the casements positioned at the ears. A first compartment is defined inside the casement 11 of the first ear component 12 and houses radio circuitry means 21 for receiving radio signals and converting the radio signals to sound. Speaker means 24 are electrically connected to the circuitry means 21. The radio circuitry preferably contains standard Integrated circuit (IC) chips readily available on the market. The radio circuitry components are not shown in detail, since they do not constitute a part of the present invention. In the preferred embodiment, contained within the second compartment which is formed inside the casement 13 of the second ear component 14 is a battery 26 which provides the electrical power for the operation of the radio.

Figure 1:
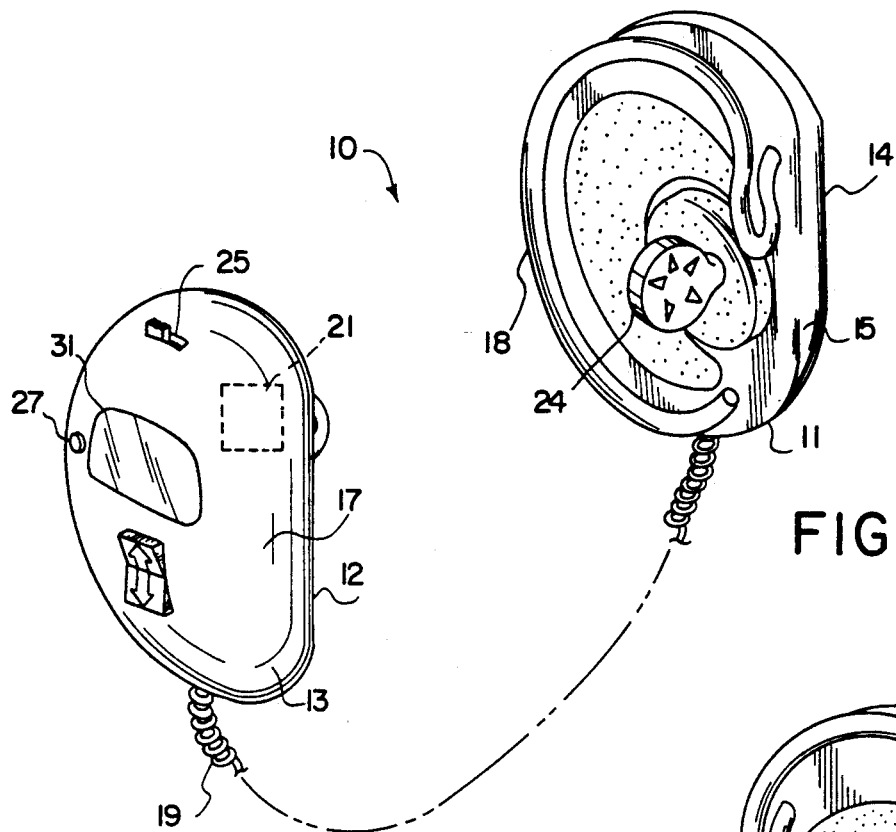
FIG. 1 shows a perspective view of a two-piece, ear-supported radio according to the present invention.
Figure 2:
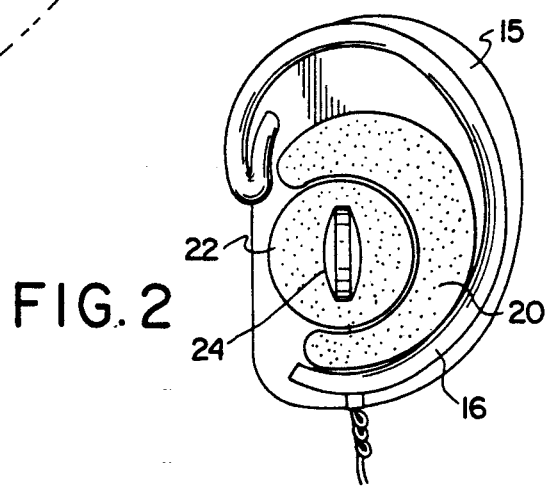
FIG. 2 is an elevational view of the inner side of the right ear component of the two piece ear-supported radio.

The two ear components 12, 14 are connected with a coil conduit 19 which electrically connects the radio circuitry 21 and the speaker means 24 in the first ear component 12 to the power source in the second ear component 14. The opposite ends of the coiled conduit (cord) 19 are connected to the bottom edge of the first and second component. The coiled cord 19 is detachable from the battery side. A door 23 is provided in the second casement 13 for easy access to the battery for its replacement. In addition to the protective function of the second casement for housing and protecting the radio circuitry, it also serves as a structural support for function controls and display elements, such as a sliding ON/OFF switch 25, radio frequency selection control 27, display means 31 and volume control 29 which are conveniently placed and easily accessible on the outer surface 17 of the casement 11 of the first component 12 as shown in FIGS. 1 and 4. In the preferred embodiment, the radio is provided with touch function controlling devices. All of the controls can be standard components. All display elements can use standard seven-segment LED digital display readout devices or LCD devices.

A small cell or camera battery can be used. The selection of the size of the battery is made such that it substantially corresponds in weight to the radio circuitry and function control devices carried by the first casement in order for the two ear components 12 and 14 to have substantially the same weight. This ensures a proper balance and provides better comfort when the two ear components are worn by the user.

First and second ear components 12, 14 fit into the respective ear cavity formed by surrounding cartilage and are provided with first and second retaining means 16, 18 which wrap each ear radio component around the respective ear of the user.

In the preferred embodiment, the first and second retaining means 16, 18 includes a flexible, but firm, wire-like element similar to that used for eyeglasses.

The flexible, wire-like element of each of the retaining means is connected to each respective ear component and supported inside the casement 11, 13.

The size and configuration of each wire-like element is adapted to conform to the juncture between the ear and the head of the user and provision is made for allowing bending of the wire-like elements if an adjustment is necessary to conform the configuration of the wire element to the individual needs of a particular user, such that comfortable and secure support can be provided for each ear component by the user's ears.

As clearly shown in FIGS. 1-4, in the preferred embodiment each wire-like element starts from the middle of the casement and extends up and around the edge of the ear component to conform to the shape of the ear and the juncture between the ear and the user's head. Such configuration makes it easier to support and firmly hold each ear component in place. In the preferred embodiment, each wire-like element is covered with neoprene sponge or rubber for better comfort and snug fit over the user's ears.

Also, on the inner surface 15 of each casement, speaker means 24 are provided which are directionally-oriented towards the user's ears. The speaker means 24, in the preferred embodiment, have a flat, small plate-like configuration and are dimensioned to snugly fit inside the ear canals and also function as a part of the means for retaining the radio ear components on the user's ears.

The radio device, according to the present invention, requires no additional support beyond that provided by the ear and the ear canal. The two ear components would be firmly secured by the retaining means of the present invention and would not slip if the person wearing the radio should participate in a vigorous activity such as exercising, jogging, or bicycling.

To further ensure a tight fit and secure retention of the ear radio components in the proper position on the user's ears and to increase the user's comfort, the inner surfaces of the ear casements are provided with inserts 20, 22, preferably made of puffed sponge material which is permanently attached to the casement surface. Use of the sponge or other material, such as, for example, foam plastic, further helps prevent dislodgement of the radio components when worn on the ears and increases comfort. Also, speakers are covered with sponge-like material for increased comfort and better fit inside the ear canals.

The casements of the ear components are made from plastic material, preferably such as ABS or polycarbonate or other plastic materials which are readily available on the market.

The radio of the present invention is very compact and lightweight, can be firmly supported solely by the user's ears and is easily adjustable for a firm and comfortable fit over the ears of the individual user. The two ear components are substantially equal in weight which provides good balance and comfort to the user. The ear-suppported radio allows for comfortable and uninterrupted use while exercising or performing some other activities, since the risk of slippage or falling from the listener's ears is substantially eliminated. Also, it does not require adjustments of the radio component's position on the user's ears which is frequently necessary with prior art headsets or portable radios during a user's activities.

Although the principles of the present invention have been described with reference to a particular embodiment, by way of example, it is understood that modifications may suggest themselves to those skilled in the art and it is intended that such modifications fall within the scope of the claims.

I claim:

1. An ear radio designed to be supported by the ears of a user, said radio comprising:
   (a) a first component comprising a first casement having inner and outer surfaces and having size and configuration substantially corresponding to the ears and to fit over a first ear of said user, radio circuitry means for receiving radio signals and converting said radio signals to sound mounted within said first casement, radio function controls mounted on said exterior surface of said first casement, radio speaker means operatively connected to said radio circuitry means and mounted on said inner surface of said first casement and extending within the ear canal of said first ear and first retaining means for retaining said first component at said first ear, said first retaining means being connected to said inner surface of said first casement and being configured to substantially follow peripheral shape of said casement and to conform to the juncture between said first ear and the head of the user;
   (b) a second component comprising a second casement having inner and outer surfaces and having size and configuration substantially corresponding to the ears and to fit over a second ear of said user, power supply means mounted within said second casement, radio speaker means mounted on said inner surface of said second casement and extending within the ear canal of said second ear, and second retaining means for retaining said second component at said second ear, said second retaining means being connected to said inner surface of said second casement and being configured to substantially follow peripheral shape of said second casement and to conform to the juncture between said second ear and the head of the user; and
   (c) circuitry for electrically connecting said power supply means and said speaker means in said second component with said radio circuitry means in said first component.

2. An ear radio according to claim 1, wherein said first and second retaining means includes a flexible, wire-like element secured to the inner surface of said first component and second component, respectively.

3. An ear radio according to claim 2, wherein said first and second retaining means also includes said speakers, said speakers being configured to contact the walls of said ear canals.

4. An ear radio according to claim 1, wherein said first and second components are about the same weight.

5. An ear radio according to claim 1, wherein said radio function controls on said first casement includes an on/off switch, a volume control, and frequency control.

6. An ear radio according to claim 1, wherein said circuitry for electrically connecting said power supply means with said radio circuitry means comprises a coiled conductor having ends which are connected to the bottom edge of said first and second casements.

7. An ear radio according to claim 3, wherein said first and second components are about the same weight.

8. An ear radio according to claim 3, wherein said speaker means includes substantially flat, plate-like elements mounted perpendicular to said inner surface of the respective casement of each ear component.

9. An ear radio according to claim 3, wherein said speakers are covered with sponge-like material.

10. An ear radio according to claim 8, wherein said speakers are covered with sponge-like material.

11. An ear radio to be supported by the ears of a user, said radio comprising:
   (a) a first component comprising a first casement having inner and outer surfaces and designed in size and configuration to fit over a first ear of said user, radio circuitry means for receiving radio signals and converting said radio signals to sound mounted within said first casement, radio function controls mounted on said exterior surface of said first casement, radio speaker means operatively connected to said radio circuitry means and mounted on said inner surface of said first casement and designed to extend within the ear canal of said first ear and first retaining means for retaining said first component at said first ear, said first retaining means being configured to conform to the juncture between said first ear and the head of the user;
   (b) a second component comprising a second casement having inner and outer surfaces and designed in size and configuration to fit over a second ear of said user, power supply means mounted within said second casement, radio speaker means mounted on said inner surface of said second casement and designed to extend within the ear canal of said second ear, and second retaining means for retaining said second component at said second ear, said second retaining means being configured to conform to the juncture between said second ear and the head of the user;
   (c) circuitry for electrically connecting said power supply means and said speaker means in said second component with said radio circuitry means in said first component; and
   wherein said first and second retaining means includes flexible wire like-element having a first loop-like portion with one end secured to the inner surface of said casement and a second portion integral with said loop-like portion and configured to snugly fit into said junction between the ears and the head.

* * * * *